(12) United States Patent
Chen et al.

(10) Patent No.: US 6,462,882 B2
(45) Date of Patent: Oct. 8, 2002

(54) LIGHT-WEIGHT HEAD-MOUNTED DISPLAY

(75) Inventors: Chungte W. Chen, Irvine; Ronald G. Hegg, Vista; William B. King, Rancho Palos Verdes, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/797,486

(22) Filed: Mar. 1, 2001

(65) Prior Publication Data

US 2002/0122259 A1 Sep. 5, 2002

(51) Int. Cl.[7] ............................................. G02B 27/14
(52) U.S. Cl. ....................................... 359/631; 359/630
(58) Field of Search ................................. 359/630, 631, 359/632, 633, 634, 636, 637, 638, 640, 815, 462, 466; 345/7, 8, 9

(56) References Cited

U.S. PATENT DOCUMENTS

| | | | |
|---|---|---|---|
| 5,499,139 A | 3/1996 | Chen et al. ................. | 359/649 |
| 5,684,634 A | * 11/1997 | Rogers ....................... | 359/630 |
| 5,748,264 A | * 5/1998 | Heggs ........................ | 348/115 |
| 6,342,871 B1 | * 1/2002 | Takeyama .................... | 345/7 |
| 6,342,872 B1 | * 1/2002 | Potin et al. .................. | 345/8 |
| 6,369,779 B1 | * 4/2002 | Bartlett ....................... | 345/8 |

* cited by examiner

Primary Examiner—Georgia Epps
Assistant Examiner—Saeed Seyrafi
(74) Attorney, Agent, or Firm—Colin M. Raufer; Leonard A. Alkov; Glenn H. Lenzen, Jr.

(57) ABSTRACT

A display device for a display wavelength range includes an image source, a relay group made of optical elements transparent to the display wavelength range, and a reflective combiner in facing relation to the relay group. The relay group includes a glass optical wedge, a glass lens, and a group of plastic lenses including a diffractive optical element. The group of plastic lenses is positioned between the glass optical wedge and the glass lens. The relay group has the optical wedge having a front face in facing relation to the image source, and a back face; an aspheric lens module having a front face in facing relation to the back face of the optical wedge, and a back face; and an aspheric lens having a front face in facing relation to the back face of the aspheric lens module, a back face, and an optical axis. The aspheric lens module is tilted and decentered with respect to the optical axis of the aspheric lens. The relay group further includes a diffractive-optical-element lens module having a front face in facing relation to the back face of the aspheric lens, and a back face; and a positive-power lens module having a front face in facing relation to the back face of the diffractive-optical-element lens module, and a back face.

18 Claims, 4 Drawing Sheets

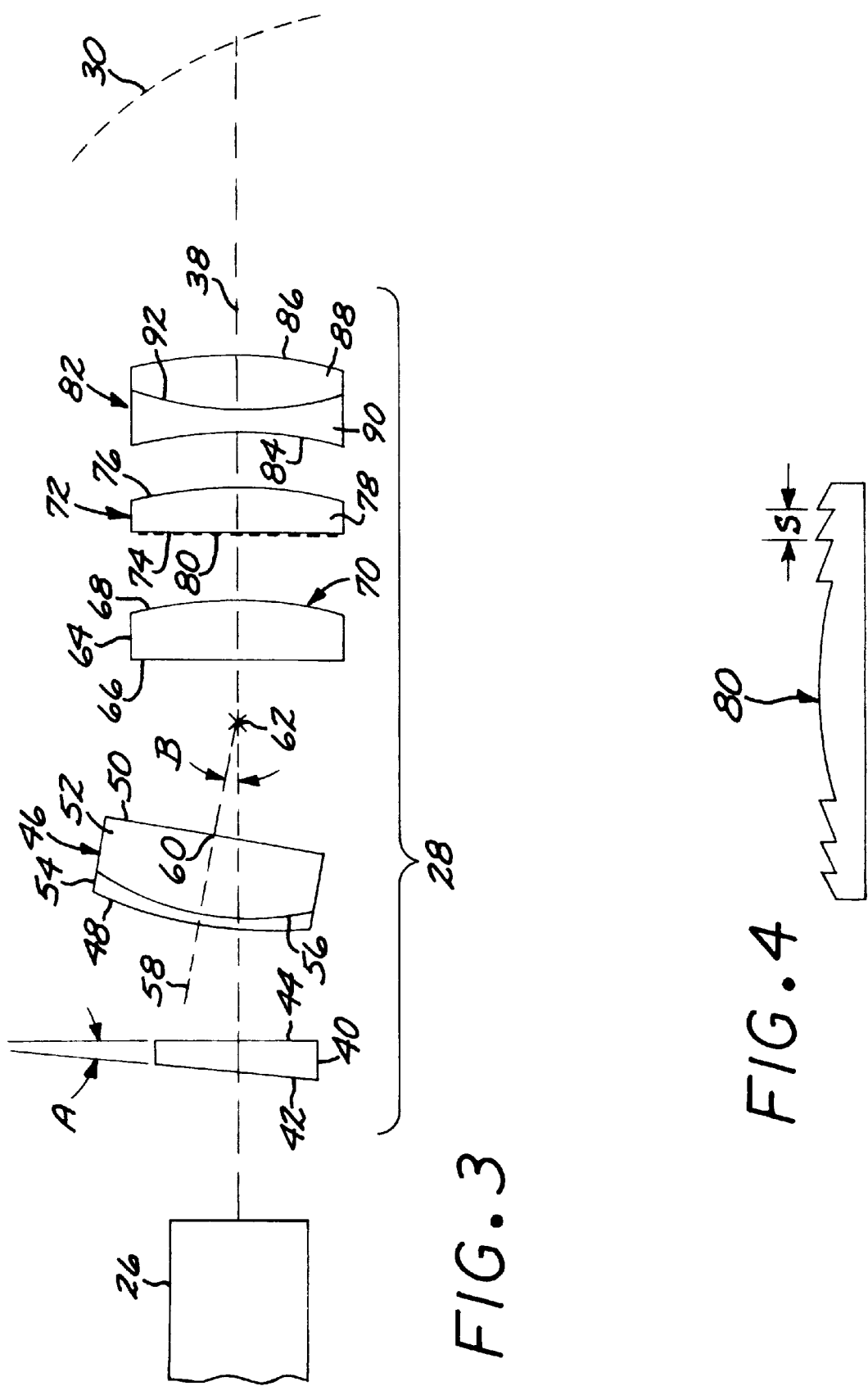

| ELEMENT | MATERIAL | n | THICKNESS | ABBE NO. | SURFACE | RADIUS, r | AIR GAP |
|---|---|---|---|---|---|---|---|
| 40 | GLASS | 1.490633 | 0.21537 | 74.86 | 42 | FLAT | |
| | | | | | 44 | FLAT | .998892 |
| 54 | PLASTIC | 1.599205 | 0.045 | 33.07 | 48 | 1.70068 | |
| | | | | | 56 | 0.750698 | |
| 52 | PLASTIC | 1.52499 | 0.401915 | 51.72 | 50 | 4.21460* | |
| 64 | PLASTIC | 1.52499 | 0.200 | 51.72 | 66 | 4.62299 | .635595 |
| | | | | | 68 | 1.80272** | |
| 78 | PLASTIC | 1.52499 | 0.276283 | 51.72 | 74 | 8.93760 | .134207 |
| | | | | | 76 | 1.82882 | |
| 90 | GLASS | 1.798477 | 0.100 | 27.97 | 84 | 3.23509 | .112938 |
| | | | | | 92 | 6.43321 | |
| 88 | GLASS | 1.795883 | 0.360615 | 50.58 | 86 | 1.70925 | |

**ASPHERIC  k=-.047369
d=.10779
e=.044374
f=0
g=0

*ASPHERIC  k=0
d=.077589
e=-.072126
f=-.026341
g=0

$Z = cp^2/(\sqrt{1+1-(k+1)c^2p^2}) + dp^2 + ep^6 + fp^8 + gp^{10}$
AND $c = 1/r$; $p^2 = x^2 + y^2$

FIG.5

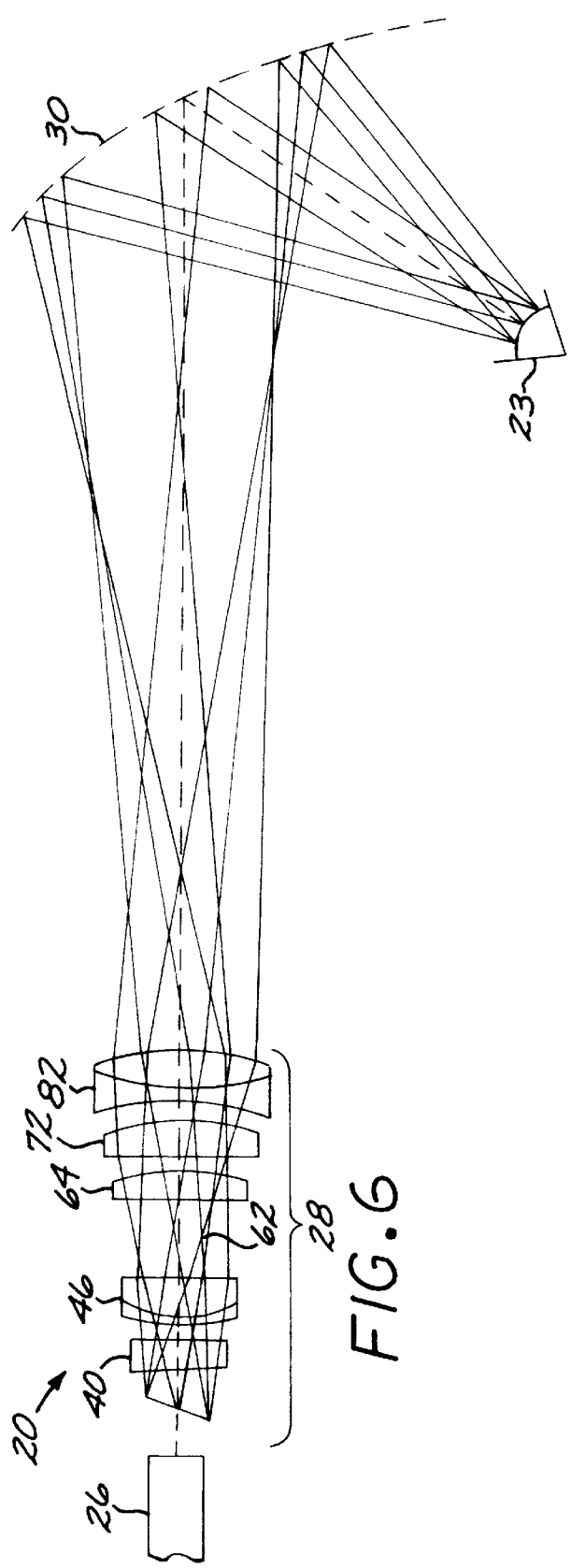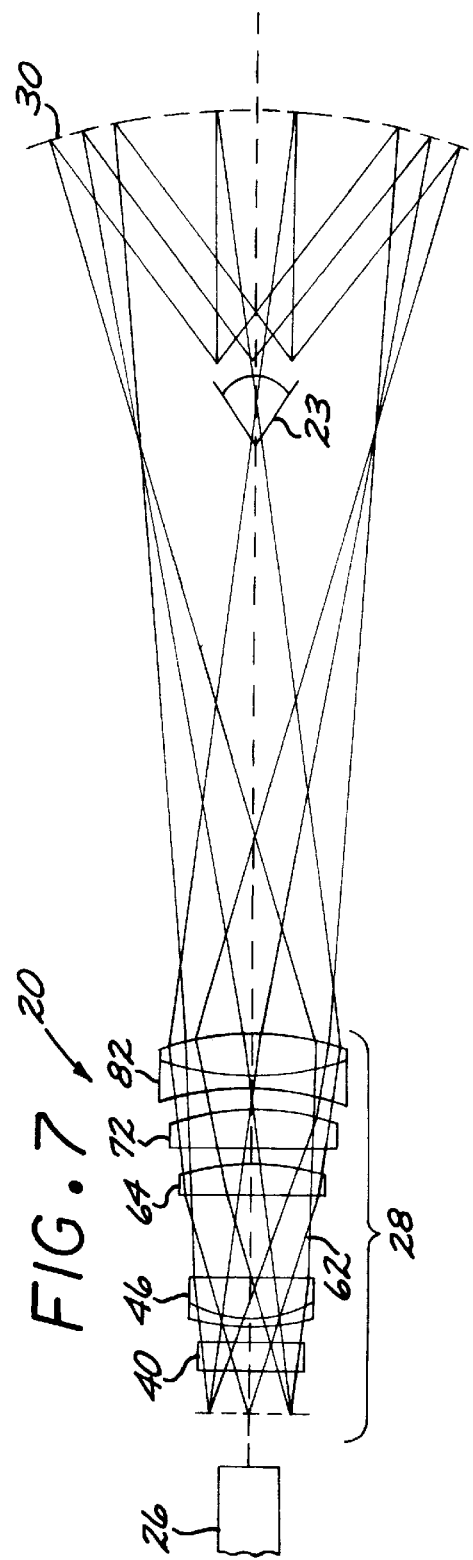

LIGHT-WEIGHT HEAD-MOUNTED DISPLAY

This invention relates to optical devices and, more particularly, to a reflective head-mounted see-through display that is light in weight and has excellent optical characteristics.

BACKGROUND OF THE INVENTION

A head-mounted display system provides information to pilots and others so that they do not need to take their eyes from an external scene in order to obtain the additional information that is available for display. In one application, the head-mounted display system is mounted to the helmet of a pilot, and the display is projected on the surface of the front visor of the helmet in front of the pilot's eyes. The pilot views the external scene directly, and also sees on the visor the display of additional information, such as a display of data or a secondary image such as an infrared image.

The helmet-mounted display requires that the display of additional information be projected at an angle from the side or top of the helmet and reflected from the curved visor to the eyes of the pilot. There is accordingly a significant distortion of the displayed information, the problem being somewhat like that of the driver of an automobile attempting to read a reflected image projected onto the windshield from the passenger seat. It is therefore necessary to pre-distort the image prior to its projection in a manner inverse to the distortion upon projection and reflection, so that the image viewed by the pilot has minimal distortion and is easily read.

In an existing helmet-mounted display such as that described in U.S. Pat. No. 5,499,139, a relay lens group projects the image produced by an image source toward the curved visor. The projection is made in a manner that pre-distorts the image so that the reflected display image ultimately viewed by the pilot has minimal distortion. The relay lens group of the '139 patent has proved quite successful in accomplishing its optical objectives.

However, the approach of the '139 patent leaves room for improvement in several areas. The relay lens group of the '139 patent has two separate lens subgroups, which makes it relatively complicated, large in size, heavy, and expensive. The weight and size of the relay lens group is extremely important, because it is mounted to the helmet and thence must be supported by the head of the pilot. The relay lens group of the '139 patent introduces a moment of inertia into the helmet structure that decreases the rate at which the pilot may turn the head, and also can become fatiguing on long missions. Because of its relative complexity, it is less robust in combat situations than is desirable. Lastly, it would be desirable to increase the pupil size of the projected display to make it more easily readable by the pilot and to allow the projected display to be optimally positioned.

There is, accordingly, a need for an improved head-mounted or helmet-mounted reflective display which improves the display system in the areas just discussed, while maintaining or improving upon its excellent optical performance. The present invention fulfills this need, and further provides related advantages.

SUMMARY OF THE INVENTION

The present invention provides a display device that may be used as a head-mounted display or a helmet-mounted reflective display. The display device has excellent optical performance with low distortion in the viewed image. It is light in weight and small in size, has a low moment of inertia mounted to the head or helmet, and is robust to meet safety and combat-environment requirements. The display device has a large pupil size and operates over a wide spectral band.

In accordance with the invention, a display device for a display wavelength range comprises an image source, a relay group made of optical elements transparent to the display wavelength range, and a reflective combiner in facing relation to the relay group. The relay group comprises an optical wedge having a front face in facing relation to the image source, and a back face; an aspheric lens module having a front face in facing relation to the back face of the optical wedge, and a back face; an aspheric lens having a front face in facing relation to the back face of the aspheric lens module, a back face, and an optical axis, the aspheric lens module being tilted and decentered with respect to the optical axis of the aspheric lens; a diffractive-optical-element lens module having a front face in facing relation to the back face of the aspheric lens, and a back face; and a positive-power lens module having a front face in facing relation to the back face of the diffractive-optical-element lens module, and a back face.

In a preferred approach, the image source is a miniature image source such as an active matrix liquid crystal display or a cathode ray tube, and the reflective combiner is part of a helmet visor. The optical wedge is made of a low-dispersion glass material. The aspheric lens module is made of plastic and comprises a positive-lens singlet made of a low-dispersion material, and a negative-lens singlet made of a high-dispersion material, and has its aspheric surface on the positive-lens singlet. The aspheric lens is made of plastic. The diffractive optical element lens is made of plastic and comprises a lens body, and a diffractive optical element embossed on the front face of the lens body with a grating spacing of greater than about 10 micrometers. The positive-power lens module is made of glass and comprises a positive-power singlet made of a low-dispersion glass material, and a negative-power singlet made of a high-dispersion glass material.

The use of optical-quality plastic elements where possible reduces the weight and cost of the display device. Compared with a conventional design, the weight of the relay group is reduced by about 60 percent, which in turn reduces the moment of inertia of the display device. The plastic elements are located between the glass optical wedge and the glass positive-power lens module, which protects them from scratching and other damage.

The use of the diffractive optical element achieves the correction of chromatic aberration in a highly efficient manner that allows weight reduction and also improves the color bandwidth of the display device. It is particularly effective in reducing higher-order chromatic aberration, which is otherwise very difficult to deal with for the large-pupil display device. Absent such a correction of the higher-order chromatic aberration, the pilot will see a rainbow effect upon rolling the eyes to view the off-axis projected image.

Thus, in one form, a display device for a display wavelength range comprises an image source, and a relay group made of optical elements transparent to the display wavelength range. The relay group comprises a glass optical wedge in facing relation to the image source, a glass lens, and a group of plastic lenses including a diffractive optical element, with the group of plastic lenses being positioned between the glass optical wedge and the glass lens. A reflective combiner is in facing relation to the glass lens.

The optical relay group has fewer optical elements than the relay lens group of the '139 patent, and the optical elements of the present optical relay group are arranged in a single grouping. The present optical relay group is therefore compact in size. The use of some plastic optical elements reduces the weight of the optical relay group. The present optical relay group is therefore more compact and lighter in weight than prior comparable optical systems, leading to a low moment of inertia and less fatigue for the pilot. The plastic aspheric lenses may be either molded or diamond machined, at a relatively low cost, leading to a relatively low cost for the entire optical relay group.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic elevational view of the display device;

FIG. 4 is a schematic view of a diffractive optical element;

FIG. 5 is a table presenting a set of design parameters for an embodiment of the optical relay group of the invention;

FIG. 6 is a schematic plan ray path view of the display device; and

FIG. 7 is a schematic side ray path view of the display device.

DETAILED DESCRIPTION OF THE INVENTION

Figure 1:
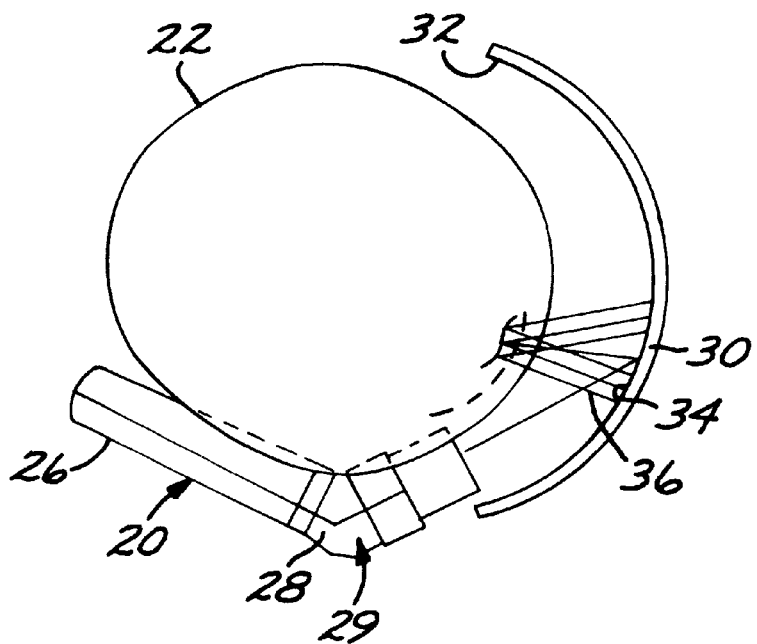
FIG. 1 is a plan view of a helmet with a display device in accordance with the invention.
Figure 2:
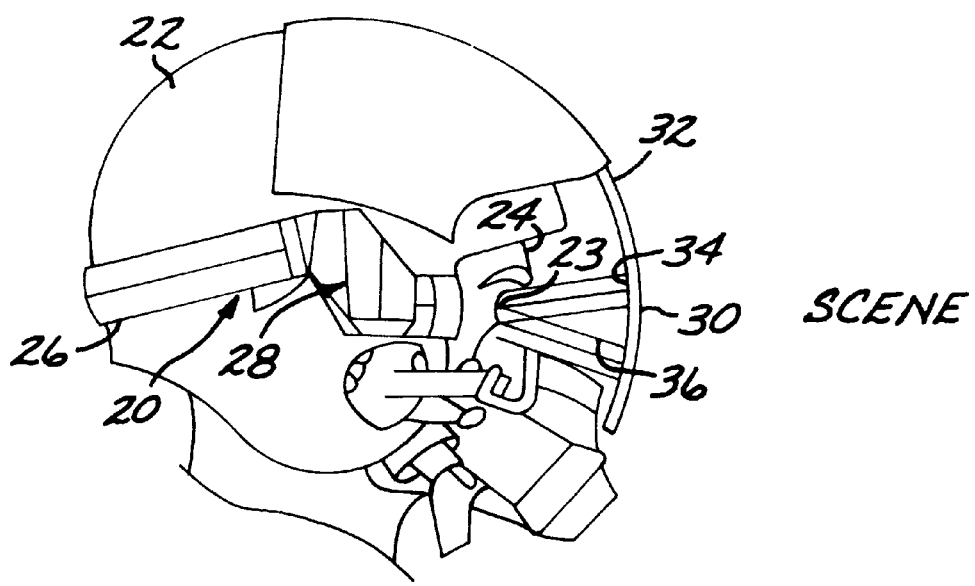
FIG. 2 is a side view of the helmet and display device of FIG. 1.

FIGS. 1 and 2 illustrate a display device 20 mounted on a helmet 22 of a human pilot 24. The display device 20 generally includes an image source 26, which may be of any operable type. A typical suitable miniature image source is an active matrix liquid crystal display (LCD), a cathode ray tube (CRT), or an organic matrix light emitting diode (LED). The display device 20 further includes an optical relay group 28 mounted within a housing 29 and a reflective combiner 30. The reflective combiner 30 is preferably a portion of the visor 32 of the helmet 22 that extends in front of the eyes 23 of the pilot 24. The reflective combiner 30 passes light through from the outside scene for the pilot to view. A display image 34 in a display wavelength range, typically the visible range, from the image source 26 is projected by the display device 20, and the display image 34 is reflected into the eyes 23 of the pilot 24 from the reflective combiner 30, as indicated by light rays 36. The display image is a virtual image that is one foot or more from the eyes 23 of the pilot 24, so that it may be easily viewed. The display image 34 may be of any useful content, such as alphanumeric information, computer-generated graphical information, and/or a visible image of the outside scene produced by a viewing device such as an infrared sensor so that the pilot 24 receives visual information from both the visible and infrared spectra.

FIG. 3 illustrates the optical relay group 28 in greater detail. The relay group 28 is made of optical elements transparent to the display wavelength range. For the visible range, the optical elements may be made of optical-grade glass or optical-grade plastic. The optical elements are arranged along an optical axis 38.

The preferred relay group 28 includes an optical wedge 40 having a front face 42 in facing relation to the image source 26, and a back face 44. There is a wedge angle A between the front face 42 and the back face 44. The optical wedge pre-corrects for axial coma introduced by the reflective combiner 30. The optical wedge 40 is made of any operable material, but it is preferably made of a low-dispersion material such as FK5 glass made by Scoots Glass Company.

The optical dispersion of a transparent material is a measure of its different optical diffraction properties for light at different wavelengths. The optical dispersion of a transparent material may be characterized by the Abbe number for the material, which is calculated as $(n_{avg}-1)/(n_1-n_2)$. In this expression, $n_1$, is the index of refraction of the transparent material at a first wavelength, here chosen as 0.486 micrometers; $n_2$ is the index of refraction of the transparent material at a second wavelength, here chosen as 0.647 micrometers; and $n_{avg}$ is 0.515 micrometers. For the present purposes, if the Abbe number is equal to or greater than about 45, the material is a "low-dispersion" material. If the Abbe number is less than about 45, the material is a "high-dispersion" material.

An aspheric lens module 46 has a front face 48 in facing relation to the back face 44 of the optical wedge 40, and a back face 50. The aspheric lens module 46 comprises a double convex positive-lens singlet 52 and a convex/concave negative-lens singlet 54, preferably joined at a surface 56. These singlets 52 and 54 may be cemented together with optical cement, as shown, or air spaced. The back face 50 of the aspheric lens module 46 is an aspheric surface for astigmatism pre-correction. The aspheric surface 50 may be on either of the singlets 52 or 54, but is preferably on the positive-lens singlet 52 to minimize the introduction of chromatic aberration. The positive-lens singlet 52 is preferably made of a low-dispersion material such as a cyclo-olefin plastic, which is preferred for light weight and good optical properties. Such cyclo-olefin plastics are available under the trademark "Zeonex" from Nippon Zeon Co. The negative-lens singlet 54 is preferably made of a high-dispersion material such as a polystyrene plastic or polycarbonate plastic for chromatic aberration correction.

The aspheric lens module 46 may be described as having a doublet axis 58 passing through its vertex 60. Additional astigmatism pre-correction is achieved by inclining the doublet axis 58 at an angle B to the optical axis 38 and by moving the vertex 60 off the optical axis 38. The magnitude of the angle B and the amount of de-centering are adjustable according to the amount of astigmatism pre-correction that is required for the specific reflective combiner 30 that is used. They have been exaggerated in FIG. 3 to aid in the illustration.

As is illustrated in relation to FIGS. 6–7, the relay group 28 has an intermediate pupil 62 between the aspheric lens module 46 and the lens to be discussed next.

The relay group 28 further includes a concave/convex aspheric lens 64 having a front face 66 in facing relation to the back face of the aspheric lens module 46 and a back face 68. The aspheric lens 64 is preferably made of optical-quality plastic such as cyclo-olefin plastic for light weight, but it may be made of glass. The aspheric lens 64 has an aspheric surface 70 (here the back face 68) to pre-correct for spherical aberration. The correction of spherical aberration allows the exit pupil to be large, which in turn allows the display device 20 to have a large eye box for the pilot 24. This accommodates eye rotation when the pilot 24 views the extreme off-axis field of view.

A concave/convex diffractive-optical-element lens module 72 has a front face 74 in facing relation to the back face 68 of the aspheric lens 64, and a back face 76. The diffractive-optical-element lens module 72 is preferably made as a lens body 78, and a diffractive optical element 80 formed, preferably by embossing, on the front face 74 of the lens body 80. The diffractive optical element lens body 78 is preferably made of a plastic such as cyclo-olefin plastic for light weight, but it may be made of glass.

FIG. 4 schematically illustrates the appearance of the diffractive optical element 80 that is formed on the front face 74. The diffractive optical element 80 is preferably a kinoform (i.e., a Fresnel zone plate) which theoretically has a 100 percent diffraction efficiency at the design wavelength. To obtain such a high diffraction efficiency, the peak-to-valley optical path difference for each zone is equal to one wavelength. The surface profile for each zone is identical to that of a lens. The diffractive optical element 80 is capable of pre-correction of primary chromatic aberration, but it most usefully employed for the correction of secondary and higher order chromatic correction, without adding any significant weight, size, or cost to the system. The diffractive optical element 80 is a series of concentric circles with a radial spacing S which varies with respect to the aperture coordinate. The value of S is preferably greater than about 10 micrometers, more preferably with its smallest value greater than about 25 micrometers. This relatively large spacing is desirable to simplify fabrication and minimize the grating shading effects. Undesired diffraction orders of the diffractive optical element 80 are reduced by this large spacing.

A positive-power lens module 82 has a front face 84 in facing relation to the back face 76 of the diffractive-optical-element lens module 72, and a back face 86 which faces the reflective combiner 30. The positive-power lens module 82 includes a double convex positive-power singlet 88 made of a low-dispersion glass material, and a double concave negative-power singlet 90 made of a high-dispersion glass material. The singlets 88 and 90 are preferably joined along a curved surface 92 with optical cement. The positive-power lens module 82 may be made of plastic, but it is preferably made of glass. The glass optical wedge 40 and the glass positive-power lens module 82 are at the opposite ends of the housing 29. They protect the other lenses of the relay group 28 that are inside the housing 29 from damage such as scratching. The positive-power lens module 82 is chosen with sufficient optical power to focus the display image 34 at the eye 23 of the pilot 24 as illustrated for the light rays 36 in FIGS. 1–2, after it has reflected from the reflective combiner 30.

FIG. 5 sets forth a presently preferred optical prescription for the optical relay group 28. In this preferred structure, angle A is 7.394985 degrees, and angle B is 3.138855 degrees. The vertex 60 is decentered from the optical axis 38 by 0.00304 inches.

FIGS. 6–7 illustrate the ray paths for the display device 20, in plan and side views respectively. An image is produced by the image source 26, passes through the optical elements of the optical relay group 28, reflects from the reflective combiner 30 (which is a part of the helmet visor 32 in the preferred embodiment), and to the eye 23 of the pilot 24. Due to the better aberration correction of the present approach, the eye box is enlarged as compared with the relay lens group of U.S. Pat. No. 5,499,139.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A display device for a display wavelength range, comprising:

an image source;

a relay group made of optical elements transparent to the display wavelength range, the relay group comprising
a glass optical wedge,
a glass lens, and
a group of plastic lenses including a diffractive optical element, the group of plastic lenses being positioned between the glass optical wedge and the glass lens, wherein the group of plastic lenses comprises:
an aspheric lens module having a front face in facing relation to a back face of the optical wedge, and a back face,
an aspheric lens having a front face in facing relation to the back face of the aspheric lens module, a back face, and an optical axis, the aspheric lens module being tilted and decentered with respect to the optical axis of the aspheric lens, and
a diffractive-optical-element lens module having a front face in facing relation to the back face of the aspheric lens, and a back face in facing relation to a front face of the glass lens; and a reflective combiner in facing relation to the glass lens.

2. A display device for a display wavelength range, comprising:

an image source;

a relay group made of optical elements transparent to the display wavelength range, the relay group comprising
an optical wedge having a front face in facing relation to the image source, and a back face,
an aspheric lens module having a front face in facing relation to the back face of the optical wedge, and a back face,
an aspheric lens having a front face in facing relation to the back face of the aspheric lens module, a back face, and an optical axis, the aspheric lens module being tilted and decentered with respect to the optical axis of the aspheric lens,
a diffractive-optical-element lens module having a front face in facing relation to the back face of the aspheric lens, and a back face, and
a positive-power lens module having a front face in facing relation to the back face of the diffractive-optical-element lens module, and a back face; and a reflective combiner in facing relation to the positive-power lens module of the relay group.

3. The display device of claim 2, wherein the image source is a liquid crystal display.

4. The display device of claim 2, wherein the optical wedge is made of a low-dispersion material.

5. The display device of claim 2, wherein the aspheric lens module is made of plastic.

6. The display device of claim 2, wherein the aspheric lens module comprises a positive-lens singlet made of a low-dispersion material, and a negative-lens singlet made of a high-dispersion material.

7. The display device of claim 2, wherein the aspheric lens module comprises an aspheric surface on the positive-lens singlet.

8. The display device of claim 2, wherein the aspheric lens is made of plastic.

9. The display device of claim 2, wherein the diffractive-optical-element lens module is made of plastic.

10. The display device of claim 2, wherein the diffractive-optical-element lens module comprises a lens body, and a diffractive optical element embossed on the front face of the lens body.

11. The display device of claim 10, wherein the diffractive optical element has a grating spacing of greater than about 10 micrometers.

12. The display device of claim 2, wherein the positive-power lens module is made of glass.

13. The display device of claim 2, wherein the positive-power lens module comprises a positive-power singlet made of a low-dispersion glass material, and a negative-power singlet made of a high-dispersion glass material.

14. The display device of claim 2, wherein the reflective combiner is a part of a helmet visor.

15. A display device for a display wavelength range, comprising:

an image source;

a relay group made of optical elements transparent to the display wavelength range, the relay group comprising a low-dispersion optical wedge having a front face in facing relation to the image source, and a back face, a plastic aspheric lens module having a front face in facing relation to the back face of the optical wedge, and a back face, the aspheric lens module comprising a positive-lens singlet made of a low-dispersion material, and a negative-lens singlet made of a high-dispersion material, a plastic aspheric lens having a front face in facing relation to the back face of the aspheric lens module, a back face, and an optical axis, the aspheric lens module being tilted and decentered with respect to the optical axis of the aspheric lens, a plastic diffractive-optical-element lens module having a front face in facing relation to the back face of the aspheric lens, and a back face, the diffractive-optical element lens comprising a lens body, and a diffractive optical element embossed on the front face of the lens body and a glass positive-power lens module having a front face in facing relation to the back face of the diffractive-optical-element lens module, and a back face, the positive-power lens module comprising a positive-power singlet made of a low-dispersion glass material, and a negative-power singlet made of a high-dispersion glass material; and a reflective combiner in facing relation to the positive-power lens module of the relay group.

16. The display device of claim 15, wherein the image source is a cathode ray tube.

17. The display device of claim 15, wherein the aspheric lens module comprises an aspheric surface on the positive-lens singlet.

18. The display device of claim 15, wherein the reflective combiner is a part of a helmet visor.

* * * * *

UNITED STATES PATENT AND TRADEMARK OFFICE
CERTIFICATE OF CORRECTION

PATENT NO.    : 6,462,882 B2
DATED         : October 8, 2002
INVENTOR(S)   : Chungte W. Chen et al.

It is certified that error appears in the above-identified patent and that said Letters Patent is hereby corrected as shown below:

<u>Column 1,</u>
Below the Title, please insert -- This invention was made with Government support under Contract No. DAAB07-96-3-J-0016 awarded by the Department of the Army. The Government has certain rights in this invention. --.

Signed and Sealed this

Twenty-first Day of October, 2003

JAMES E. ROGAN
*Director of the United States Patent and Trademark Office*